(12) United States Patent
Smith

(10) Patent No.: US 8,134,489 B2
(45) Date of Patent: Mar. 13, 2012

(54) SYSTEM AND METHOD FOR BISTATIC CHANGE DETECTION FOR PERIMETER MONITORING

(75) Inventor: Brian H. Smith, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 12/172,668

(22) Filed: Jul. 14, 2008

(65) Prior Publication Data

US 2010/0007549 A1    Jan. 14, 2010

(51) Int. Cl.
*G01S 13/00* (2006.01)
(52) U.S. Cl. .................. 342/25 R; 342/25 A; 342/176
(58) Field of Classification Search .................. 342/25 A
See application file for complete search history.

(56) References Cited

U.S. PATENT DOCUMENTS

| | | | | |
|---|---|---|---|---|
| 6,130,644 | A * | 10/2000 | Massonnet | 342/453 |
| 6,233,008 | B1 * | 5/2001 | Chun | 348/170 |
| 6,466,156 | B1 * | 10/2002 | Ulander | 342/25 R |
| 6,578,017 | B1 * | 6/2003 | Ebersole et al. | 706/3 |
| 7,619,554 | B2 * | 11/2009 | Shklarsky | 342/25 A |
| 2003/0140774 | A1 * | 7/2003 | Malakatas | 89/41.01 |
| 2007/0164894 | A1 * | 7/2007 | Sherman et al. | 342/25 F |
| 2008/0158256 | A1 * | 7/2008 | Russell et al. | 345/629 |
| 2008/0165048 | A1 * | 7/2008 | Shklarsky | 342/59 |
| 2008/0224923 | A1 * | 9/2008 | Aprile | 342/25 D |

OTHER PUBLICATIONS http://www.fas.org/irp/threat/maritime2020/CHAPTER2.htm. Chapter II "Challenges to Maritime Security 2020" prepared by the Office of Naval Intelligence & Coast Guard Intelligence Coordination Center Mar. 1, 1999, 44 Pages.
http://portal.acm.org/citation.cfm?id=547052, Abstract to Thompson et al. "Spotlight-Mode Synthetic Aperture Radar: A Signal Processing Approach," 2 Pages.

* cited by examiner

*Primary Examiner* — Timothy A Brainard
(74) *Attorney, Agent, or Firm* — Harness, Dickey & Pierce, P.L.C.

(57) ABSTRACT

A method for monitoring an area that involves transmitting a first electromagnetic wave signal from a mobile platform moving over a ground surface, toward the ground surface. A receiver is used that is located remote from the mobile platform to receive the first electromagnetic wave signal after the signal is reflected from the ground surface. The first electromagnetic wave signal is processed to form a first synthetic aperture radar (SAR) image. Subsequently the receiver is used to receive a second electromagnetic wave signal transmitted from the mobile platform at a time subsequent to transmission of the first electromagnetic wave signal. The second electromagnetic wave signal is then processed to obtain a second SAR image. The first and second SAR images are then coherently analyzed to determine areas of non-correlation between the images.

15 Claims, 3 Drawing Sheets

SYSTEM AND METHOD FOR BISTATIC CHANGE DETECTION FOR PERIMETER MONITORING

FIELD

The present disclosure relates to border and perimeter monitoring systems and applications, and more particularly to a system and method that use electromagnetic wave signals to generate images of a border or perimeter area that can be compared to detect the presence and movement of individuals or objects in the geographic area being monitored.

BACKGROUND

The statements in this section merely provide background information related to the present disclosure and may not constitute prior art.

Presently there is a growing interest in monitoring border areas, for example, the geographic border between the United States and Mexico. Cost effective monitoring of the perimeter of an important structure, for example a military facility, a bridge, power generating station, water treatment station, etc., is also increasing in interest.

Presently available monitoring systems have typically been somewhat costly to implement and/or to operate, or have suffered from one or more other drawbacks. For example, monitoring operations performed by individuals traversing a region by ground vehicles or by airborne vehicles can be quite costly. Attempts at reducing the operating or implementation costs for a monitoring station have sometimes involved the use of a plurality of terrestrially mounted cameras. However, such cameras often need to be mounted on towers or elevated platforms, and once mounted, may be difficult to inspect and/or repair. For monitoring large geographic areas, sometimes hundreds or more cameras are required to fully image the area in question. And the optical image provided by a camera can be significantly adversely affected by environmental conditions such as rain, fog, snow, etc.

Other attempts at implementing monitoring systems have involved obtaining image data from one or more cameras or optical sensors located on a flying airborne platform. The electronic image data obtained by equipment on the airborne mobile platform is relayed via RF signals, or via a transponded satellite link, to electronic equipment at a ground based control station. The image data is processed at the ground station and used by individuals charged with managing the monitoring operation. As will be appreciated, this type of system involves a very significant cost, both in its initial implementation and in its on-going operations. Typically large amounts of data need to be up-linked to the selected satellite and then down-linked from the satellite to the ground station. The use of a satellite link adds significant cost and complexity to such a system, not to mention the cost of the complex electronics that must be carried on board the airborne platform.

SUMMARY

In one aspect the present disclosure relates to a method for monitoring an area. The method may comprise: transmitting a first electromagnetic wave signal from a mobile platform moving over a ground surface, toward the ground surface; using a receiver located remote from the mobile platform to receive the first electromagnetic wave signal after the first electromagnetic wave signal is reflected from the ground surface; processing the first electromagnetic wave signal to form a first synthetic aperture radar (SAR) image; subsequently using the receiver to receive a second electromagnetic wave signal transmitted from the mobile platform and reflected from the ground surface, at a time subsequent to transmission of the first electromagnetic wave signal; processing the second electromagnetic wave signal to obtain a second SAR image; and analyzing the first and second SAR images to determine areas of non-correlation between the images.

In another aspect the present disclosure relates to a method for monitoring a geographic area. The method may comprise: transmitting a first electromagnetic wave signal from an airborne mobile platform flying over a ground surface, toward the ground surface; using a receiver located remote from the airborne mobile platform to receive the first electromagnetic wave signal after the first electromagnetic wave signal is reflected from the ground surface; processing the first electromagnetic wave signal to form a first synthetic aperture radar (SAR) image; subsequently using the receiver to receive a second electromagnetic wave signal transmitted from the airborne mobile platform at a time subsequent to transmission of the first electromagnetic wave signal, and after the second electromagnetic wave signal has been reflected from the ground surface; processing the second electromagnetic wave signal to obtain a second SAR image; and analyzing the first and second SAR images to determine areas of non-correlation between the SAR images; and using the areas of non-correlation to form a two dimensional change map of a predetermined geographic region, the two dimensional change map highlighting differences between the two SAR images to make the differences visually perceptible to an individual.

In another aspect the present disclosure relates to a system for monitoring an area. The system may comprise: a mobile platform; an electromagnetic wave signal transmitter supported on the mobile platform for transmitting electromagnetic wave signals toward a ground surface over which the mobile platform is traversing; a receiver located remote from said mobile platform to sequentially receive first and second ones of said electromagnetic wave signals transmitted from said transmitter after said first and second electromagnetic wave signals have reflected from said ground surface within a predetermined geographic region over which said mobile platform is traversing; and a processor adapted to process the first and second electromagnetic wave signals to form first and second synthetic aperture radar (SAR) images, and to analyze the images to determine areas of non-correlation between the images within the predetermined region of the ground surface.

It will be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
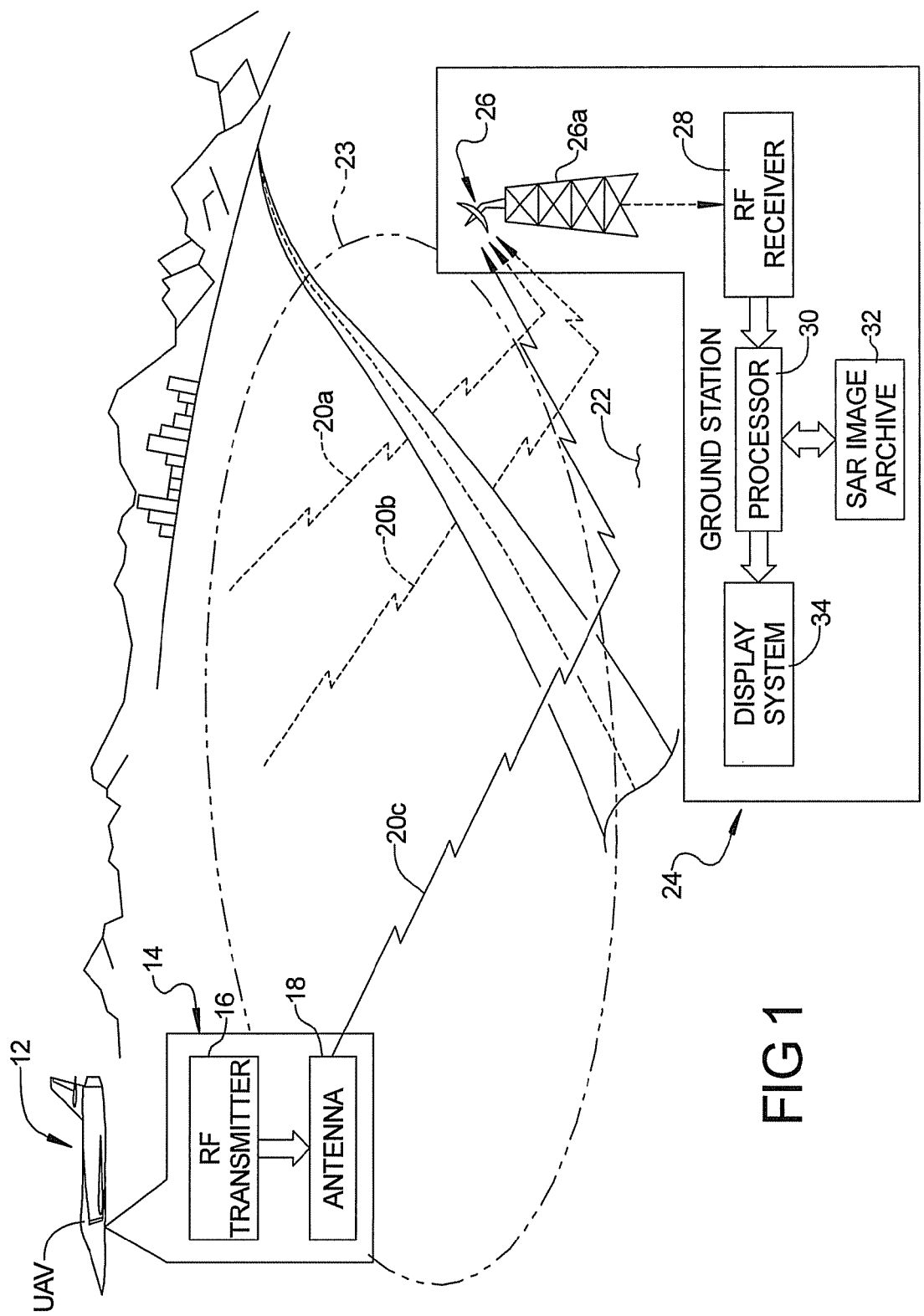
FIG. 1 is a block diagram of a system in accordance with one embodiment of the present disclosure.

Referring to FIG. 1, there is shown a bistatic monitoring system 10 in accordance with one embodiment of the present disclosure. The system 10 includes a mobile platform 12, which in this example is shown as an unmanned air vehicle (hereinafter "UAV" 12) having an on-board electronics system 14 that includes a radio frequency (RF) transmitter 16 and an antenna 18. The RF transmitter 16 generates electronic signals that are transmitted as electromagnetic wave (hereinafter simply "RF") signals 20a, 20b and 20c towards a ground surface 22 as the UAV flies over a predetermined geographic area or region 23. The RF signals 20a-20c are transmitted sequentially as the UAV 12 makes a plurality of passes over the same predetermined geographic area 23. Thus, there will be some tangible degree of time separation between when the signals 20a-20c are generated. For example, the signals 20a, 20b and 20c may be separated in time by minutes, hours, days, weeks or even months. It is expected that in most applications, the UAV 12 will pass over a predetermined region a .plurality of times, and that successive passes will be separated most typically by hours or days. The RF signals 20a-20c generated by the RF transmitter 16 of the UAV 12 are typically selected to be within the frequency band of about 200 MHz - 30GHz.

While the UAV 12 is shown as forming the mobile platform, it be appreciated that a land vehicle may potentially also be used for transmitting the RF signals 20a-20c. For example, a land vehicle could be driven along an elevated ridge adjacent to a canyon or valley, with an on-board antenna directing RF signals towards the floor of the canyon or valley. The reflected signals could then be received by a terrestrial based receiver located near the canyon or valley floor, or possibly on a ridge on the opposite side of the canyon or valley.

The system 10 could also be implemented in a marine application. For example, a ship could be used to transmit electromagnetic wave signals that are reflected off of water, picked up by a different ship or land-based monitoring station, and used to look for other vessels in a predetermined portion of an ocean or sea. Still further, potentially a space application could be implemented where a transmitter is located on a space vehicle, for example on a satellite.

Referring further to FIG. 1, the system 10 further includes a terrestrial based monitoring station 24, which will be referred to for convenience simply as the "ground station" 24. The ground station 24 includes an antenna 26, an electromagnetic wave signal receiver 28 (hereinafter simply "RF receiver" 28), a processor 30, a data storage system 32 that forms an archive for synthetic aperture radar (SAR) images generated by the processor 30 (hereinafter simply the "SAR image archive" 32), and a display system 34. The antenna 26 preferably is mounted on a tower 26a and receives the RF signals 20a-20c after they have been reflected from the ground surface 22. The signals output from the antenna 26 are input to the RF receiver 28 which generates electrical signals corresponding to the received RF signals, which are input to the processor 30. The electrical signals are used by the processor 30 to generate a synthetic aperture radar image of the predetermined geographic area 23 that is traversed by the UAV 12 which is stored in the SAR image archive 32. It will also be appreciated that the components of the ground station 24 need not be co-located at a common location, as long as they are able to communicate (either via wired or wireless links). For example, there could be several towers with antennas monitoring different regions of a border, and a common ground station processing all of the data received from all of the antennas.

Each SAR image stored in the SAR image archive 32 represents a complex-valued image made up of a large plurality of pixels, typically on the order of millions pixels. Each pixel will have an associated magnitude and phase. On each pass by the UAV 12 over the predetermined geographic area 23, the processor 30 uses the reflected RF signals received by the antenna 26 to generate an SAR image of the predetermined geographic area 23 that is traversed during that particular pass, that is then stored in the SAR image archive 32. Thus, after two passes by the UAV 12 over the area 23, the processor 30 will have created and stored two SAR images, after three passes the processor will have created and stored three SAR images, and so forth. The geometry of the two flight paths is chosen to ensure coherency between the two data collections. It will be appreciated, however, that one could create more than one SAR image per pass. Multiple SAR images per pass might improve the quality of the SAR images obtained.

Figure 2:
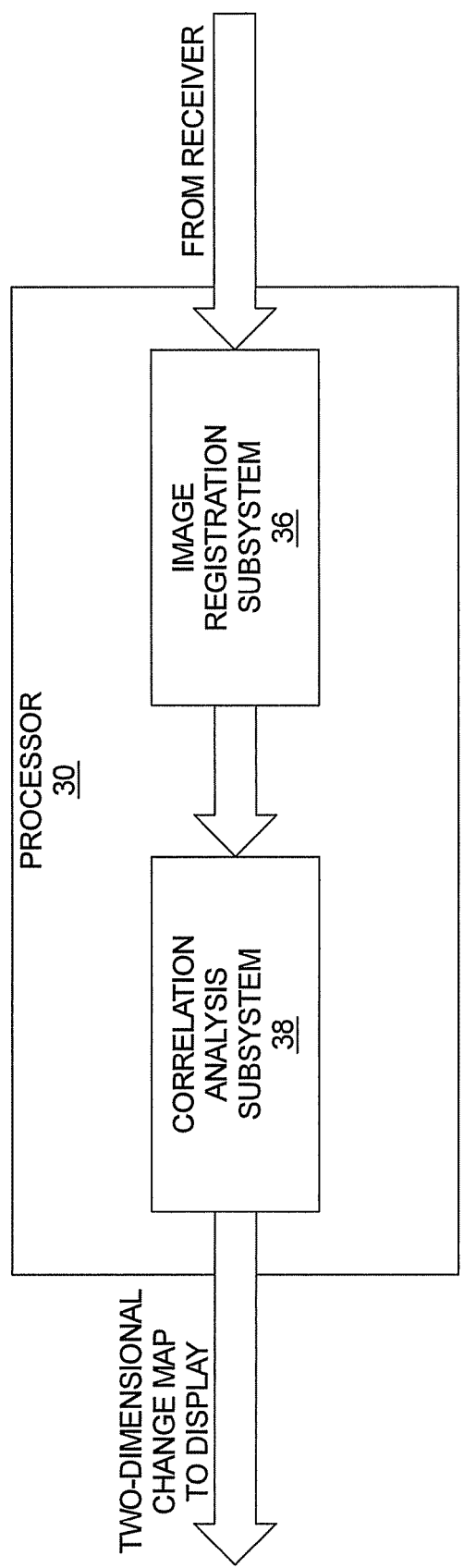
FIG. 2 is a block diagram of the processor shown in FIG. 1.

Referring to FIG. 2, the processor 30 includes an image registration subsystem 36 that is used to "register" any two images, and most typically two successively created SAR images. By "register" it is meant that the two images are mathematically warped to correct for residual geometric differences and to align surface features of the two SAR images. A correlation analysis subsystem 38 coherently analyzes the two selected images, pixel-by-pixel, in phase and in magnitude, to determine regions of pixels that do not correlate, and to identify those regions that do correlate. The correlation regions are chosen to be small enough to provide sufficient spatial resolution of the changes, but large enough to contain enough pixels to reduce the measurement noise. Typically, a correlation region may by 3×3 to 8×8 pixels, depending on the sensor and data characteristics. The correlating and non-correlating pixel regions are then used to form a high resolution, two-dimensional "change" map in which the non-correlating regions are highlighted, for example darkened, to make them more easily visually perceptible. By "change" map, it is meant a map of the predetermined geographic area 23, created from two SAR images, that has any changes between the two images, such as the presence or absence of vehicles, individuals, or geographic features, highlighted to make them easily visually perceptible. The resulting two-dimensional change map is then displayed on the display system 34. The display system 34 may be a CRT or LCD display, or any other form of display suitable for displaying graphical images.

Figure 3:
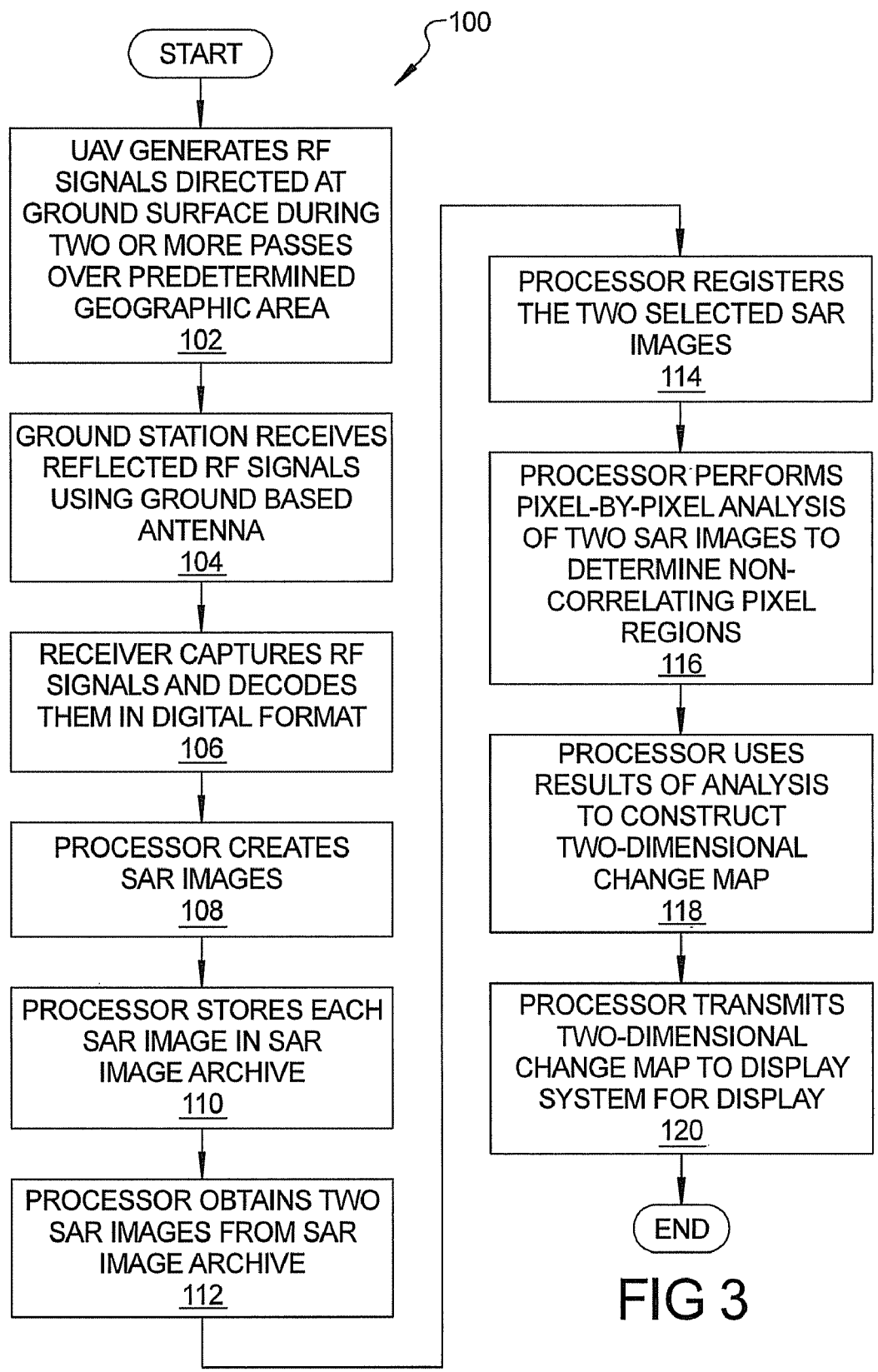
FIG. 3 is a flowchart of operations performed by the system in carrying out a monitoring operation.

Referring now to FIG. 3, a flowchart 100 is shown to illustrate various operations that are performed by the system 10 shown in FIG. 1. Initially, at operation 102 the UAV 12 makes two or more passes over the predetermined geographic region area 23 and generates RF signals (such as signals 20a-20c) that are directed toward the ground surface 22, and reflected from the ground surface. At operation 104 the ground station 24 receives the reflected RF signals using antenna 26. At operation 106 the RF receiver 28 typically captures the RF signals provided by the antenna 26 and encodes them in a digital format, and provides its output to the processor 30. At operation 108 the processor creates a plurality of SAR images, one associated with each pass of the UAV 12 over the predetermined geographic area 23. At operation 110 the processor 30 stores each SAR image in the SAR image archive 32.

At operation 112 the processor 30 accesses the SAR image archive 32 and obtains two (or potentially more) of the SAR images At operation 114 the processor 30 registers the two SAR images. At operation 116 the processor 30 performs a pixel-by-pixel comparison of the two SAR images to determine corresponding pixel regions from the two SAR images that do not correlate. At operation 118 the processor 30 uses the information obtained from its analysis to construct the high resolution, two-dimensional change map of the predetermined geographic region 23. At operation 120 the processor 30 transmits the two-dimensional change map to the display system 34 for display and subsequent analysis. The subsequent analysis may be performed by an individual or by an automated algorithm adapted to digitally analyze the change map.

The system 10 and method of the present disclosure provides the significant advantage that no separate communication signal is needed from the UAV 12 to any external subsystem or transponder in order to pass large amounts of data. This significantly simplifies the acquisition of information from the UAV 12 and can significantly reduce the overall cost of implementing and operating a monitoring system. In particular, since the system 10 is a bistatic system, it does not require a receiver or mission data communication system to be located on-board the UAV 12, which reduces cost associated with outfitting the UAV for use with the system 10. This also reduces the weight of the UAV 12 and can contribute to longer in-flight operational times for the UAV. Unlike a ground-based only system (e.g., using fixed, ground-based cameras or sensors), the high resolution, two-dimensional change map produced by the system 10 is much better able to resolve false alarms such as blowing vegetation and animal activity.

The system 10 and method of the present disclosure is especially well suited for monitoring perimeter areas, such as geographic borders between countries or the perimeter of a facility (e.g., power station, water treatment facility, etc.).

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for monitoring an area, comprising:
    providing a ground station having a single, terrestrial based antenna and a receiver in communication with the antenna, and further orienting the antenna such that the antenna has a field of view able to receive an electromagnetic wave signal reflected from a ground surface within a predetermined geographic area;
    transmitting a first electromagnetic wave signal from a mobile platform moving along a first predetermined path of travel over the ground surface, the first electromagnetic wave signal being transmitted toward predetermined geographic area of said ground surface;
    using said terrestrial based antenna oriented to receive the first electromagnetic wave signal after the first electromagnetic wave signal has been reflected from one of said ground surface or an object on the ground surface;
    using said receiver located remote from said mobile platform to receive said first electromagnetic wave signal from said terrestrial based antenna;
    using a processor remotely located from said mobile platform to process said first electromagnetic wave signal to form a first synthetic aperture radar (SAR) image;
    using the mobile platform to transmit a second electromagnetic wave signal toward the ground surface while the mobile platform is moving along a second predetermined path of travel at least substantially the same as the first predetermined path of travel;
    subsequently using the terrestrial based antenna to receive the second electromagnetic wave signal transmitted from the mobile platform after the second electromagnetic wave signal has been reflected from one of the ground surface or the object;
    subsequently using said receiver to receive said second electromagnetic wave signal from said terrestrial based antenna at a time subsequent to transmission of said first electromagnetic wave signal;
    using said processor to process said second electromagnetic wave signal to obtain a second SAR image; and
    using said processor to analyze pixels making up each of said first and second SAR images to determine areas of non-correlation between said images.

2. The method of claim 1, wherein transmitting first and second electromagnetic wave signals from said mobile platform comprises transmitting first and second electromagnetic wave signals from an airborne mobile platform.

3. The method of claim 1, wherein using a receiver located remote from said mobile platform comprises using a receiver that is located at a ground station on said ground surface.

4. The method of claim 1, wherein using a receiver located remote from said mobile platform comprises using a receiver that is located at an antenna mounted on said ground surface.

5. The method of claim 1, further comprising archiving said first and second images in an image archive.

6. The method of claim 1, wherein analyzing said first and second SAR images comprises geometrically aligning said two SAR images, and subsequently analyzing a magnitude and a phase of each said pixel of each of said first and second SAR images to determine ones of said pixels that do not correlate with one another.

7. The method of claim 6, further comprising using a display system to display a two dimensional change map created from said first and second SAR images, where the two dimensional change map uses said non-correlating pixels to highlight differences between said first and second SAR images.

8. The method of claim 1, wherein said mobile platform comprises an airborne vehicle.

9. The method of claim 1, wherein said mobile platform comprises an unmanned vehicle.

10. The method of claim 1, wherein said ground station receives and uses only said waves signals that are reflected from a ground surface.

11. A method for monitoring a geographic area, comprising:
    providing a ground station having a single, terrestrial based antenna and a receiver in communication with said antenna, and further orienting the antenna such that said antenna has a field of view able to receive an electromagnetic wave signal reflected from said ground surface within a predetermined geographic area;
    transmitting a first electromagnetic wave signal from an airborne mobile platform flying over said ground surface, toward said ground surface, while the airborne mobile platform is flying along a first predetermined path of travel;
    using said receiver located remote from said airborne mobile platform to receive said first electromagnetic wave signal after said first electromagnetic wave signal is reflected from said ground surface;
    using a processor remotely located from said mobile platform to process said first electromagnetic wave signal to form a first synthetic aperture radar (SAR) image;
    using the airborne mobile platform to transmit a second electromagnetic wave signal toward the ground surface while the airborne mobile platform is travelling along a second predetermined path of travel that is at least substantially similar to the first predetermined path of travel;

subsequently using said receiver to receive said second electromagnetic wave signal at a time subsequent to transmission of said first electromagnetic wave signal, and after said second electromagnetic wave signal has been reflected from said ground surface;

using said processor to process said second electromagnetic wave signal to obtain a second SAR image;

using said processor to analyze pixels making up each of said first and second SAR images to determine areas of non-correlation between said SAR images; and using said areas of non-correlation to form a two dimensional change map of a predetermined geographic region, said two dimensional change map highlighting differences between said two SAR images to make said differences visually perceptible to an individual.

12. The method of claim 11, further comprising displaying said two dimensional change map on a display system.

13. The method of claim 11, wherein using a receiver located remote from said mobile platform comprises using a terrestrially located receiver.

14. The method of claim 11, further comprising archiving said first and second SAR images in an image archive.

15. The method of claim 11, wherein analyzing said first and second SAR images to determine areas of non-correlation comprises geometrically aligning said two SAR images, and subsequently analyzing a magnitude and a phase of each said pixel of each of said first and second SAR images to determine ones of said pixels that do not correlate with one another.

* * * * *